United States Patent
Hong

(10) Patent No.: US 11,617,111 B2
(45) Date of Patent: Mar. 28, 2023

(54) METHOD AND APPARATUS FOR OVERHEAT PROTECTION OF USER EQUIPMENT, AND BASE STATION

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 156 days.

(21) Appl. No.: 16/648,613

(22) PCT Filed: Sep. 19, 2017

(86) PCT No.: PCT/CN2017/102268
§ 371 (c)(1),
(2) Date: Mar. 18, 2020

(87) PCT Pub. No.: WO2019/056177
PCT Pub. Date: Mar. 28, 2019

(65) Prior Publication Data
US 2021/0392552 A1    Dec. 16, 2021

(51) Int. Cl.
*H04W 36/00* (2009.01)
*H04W 36/08* (2009.01)

(52) U.S. Cl.
CPC ... *H04W 36/0033* (2013.01); *H04W 36/0016* (2013.01); *H04W 36/08* (2013.01)

(58) Field of Classification Search
CPC ......... H04W 36/0033; H04W 36/0016; H04W 36/08; H04W 36/0011; H04W 28/0215
See application file for complete search history.

(56) References Cited

U.S. PATENT DOCUMENTS

| | | |
|---|---|---|
| 9,161,254 B2 | 10/2015 | Han et al. |
| 9,386,487 B2 | 7/2016 | Zhu et al. |
| 9,603,132 B2 | 3/2017 | Han et al. |
| 9,609,602 B2 | 3/2017 | Jain et al. |
| 2014/0092821 A1 | 4/2014 | Zhu et al. |
| 2014/0092886 A1 | 4/2014 | Gupta |
| 2014/0094162 A1 | 4/2014 | Heo et al. |

(Continued)

FOREIGN PATENT DOCUMENTS

| | | |
|---|---|---|
| CN | 102186227 A | 9/2011 |
| CN | 104584672 A | 4/2015 |

(Continued)

OTHER PUBLICATIONS

16477790,Certified_Copy_of_Foreign_Priority_Application,Jul. 12, 2019 (PCT/CN2017/078228) (Year: 2017).*

(Continued)

*Primary Examiner* — Chi H Pham
*Assistant Examiner* — Ji-Hae Yea
(74) *Attorney, Agent, or Firm* — Arch & Lake LLP

(57) ABSTRACT

A method and apparatus are provided for overheat protection of UE. The method includes: determining a second signaling based on a first signaling when the UE is handed over to a target base station, wherein the first signaling is an original handover preparation signaling; and sending the second signaling to the target base station, wherein the second signaling carries overheat-related information of the UE.

10 Claims, 5 Drawing Sheets

401
Adding a sixth signaling to a network internode definition signaling, adding the sixth signaling to the handover preparation signaling to obtain the second signaling, wherein the sixth signaling is configured to indicate the overheat-related information of the UE 402
Sending the second signaling to the target base station

(56) References Cited

U.S. PATENT DOCUMENTS

| | | | |
|---|---|---|---|
| 2015/0092641 A1 | 4/2015 | Koc et al. | |
| 2016/0157178 A1 | 6/2016 | Koc et al. | |
| 2016/0381730 A1 | 12/2016 | Jain et al. | |
| 2017/0215156 A1 | 7/2017 | Chen | |
| 2017/0311208 A1* | 10/2017 | Yu | H04W 36/0016 |
| 2020/0128479 A1* | 4/2020 | Xu | H04W 24/10 |

FOREIGN PATENT DOCUMENTS

| | | |
|---|---|---|
| CN | 105282783 A | 1/2016 |
| JP | 2015026996 A | 2/2015 |

OTHER PUBLICATIONS

PCTCN2017078228APPL_Eng translated w Google Online (Year: 2017).*

16477790,Certified_Copy_of_Foreign_Priority_Application,Jul. 12, 2019 (CN 201710026111.3) (Year: 2017).*

CN201710026111APPL_Eng translated w Google Online (Year: 2017).*

Huawei, et al., "Introduction of the overheating indication", 3GPP TSG-RAN WG2 Meeting #99, R2-1708223, Berlin, Germany, Aug. 21-25, 2017 (Year: 2017).*

International Search Report of PCT Application No. PCT/CN2017/102268 dated Dec. 27, 2017 (6p).

First Office Action of Chinese Application No. 201780001456.1 dated Mar. 21, 2019 with English translation (13p).

Second Office Action of Chinese Application No. 201780001456.1 dated May 28, 2019 with English translation, (10p).

Huawei, et al., "Low overhead signalling for UE overheating indication", 3GPP TSG-RAN WG2#99 R2-1708220, Berlin, Germany, Aug. 25, 2017, section 2.2, (4p).

Huawei, et al., "Introduction of the overheating indication", 3GPP TSG-RAN WG2 Meeting #99 R2-1708223, Berlin, Germany, Aug. 25, 2017, Handover Preparation Information and AS-Context, (63p).

* cited by examiner

US 11,617,111 B2

METHOD AND APPARATUS FOR OVERHEAT PROTECTION OF USER EQUIPMENT, AND BASE STATION

CROSS-REFERENCE TO RELATED APPLICATION

This application is a national phase application based on PCT/CN2017/102268, filed on Sep. 19, 2017, the content of which is incorporated herein by reference.

TECHNICAL FIELD

The present disclosure relates to the field of wireless communication technology, and in particular to a method and apparatus for overheat protection of user equipment (UE), and a base station.

BACKGROUND

In a long-term evolution (LTE) system, high-order multiple-input multiple-output (MIMO), multi-carrier aggregation or high-order modulation and decoding and other wireless transmission manners may be configured for UE to meet the requirements of users for high-speed data transmission rates. However, such wireless transmission manners of high-speed may cause overheating of the UE, which may further cause the problems of transmission interruption of the service data of the UE, restart of the device, and the like. A base station may help the UE to solve the problem of overheating by reducing the wireless link configuration of the UE.

SUMMARY

The embodiments of the present disclosure provide a method and device for overheat protection of the UE and a base station.

According to the first aspect of the present disclosure, a method for overheat protection of user equipment (UE) is provided, wherein the method is applied to a source base station, and the method includes:

determining a second signaling based on a first signaling when the UE is handed over to a target base station, wherein the first signaling is an original handover preparation signaling; and sending the second signaling to the target base station, wherein the second signaling carries overheat-related information of the UE.

According to the second aspect of the present disclosure, a method for overheat protection of UE is provided, wherein the method is applied to a target base station, and the method includes:

receiving a second signaling sent by a source base station; and parsing the second signaling to obtain overheat-related information of the UE performing a handover operation.

According to the third aspect of the present disclosure, an apparatus for overheat protection of UE is provided, wherein the apparatus is applied to a source base station, and the apparatus includes:

a processor; and a memory configured to store processor-executable instructions; wherein the processor is configured to:

determine a second signaling based on a first signaling when the UE is handed over to a target base station, wherein the first signaling is an original handover preparation signaling; and send the second signaling to the target base station, wherein the second signaling carries overheat-related information of the UE.

According to the fourth aspect of the present disclosure, an apparatus for overheat protection of UE is provided, the apparatus is applied to a target base station, and the apparatus includes:

a processor; and a memory configured to store processor-executable instructions; wherein the processor is configured to:

receive a second signaling sent by a source base station; and parse the second signaling to obtain overheat-related information of the UE performing a handover operation.

It should be understood that the above general description and the following detailed description are merely exemplary and explanatory, and should not limit the present disclosure.

BRIEF DESCRIPTION OF THE DRAWINGS

The accompanying drawings, which are incorporated in and constitute a part of this specification, illustrate embodiments consistent with the present invention and, together with the description, and serve to explain principles of the present disclosure.

DETAILED DESCRIPTION

Exemplary embodiments will be described in detail here, and the examples thereof are illustrated in the accompanying drawings. When the following description refers to the accompanying drawings, the same numerals in different accompanying drawings represent the same or similar elements unless otherwise indicated. The implementation manners described in the following exemplary embodiments do not represent all implementation manners consistent with the present disclosure. Rather, they are merely the examples of devices and methods consistent with some aspects of the disclosure as detailed in the appended claims.

In the related art, when the UE is handed over from a source base station to a target base station, the target base station may provide an overheating UE with an excessively high wireless link configuration due to uncertain of the current states of the UE, which makes the UE's overheating problem be more serious.

Figure 1A:
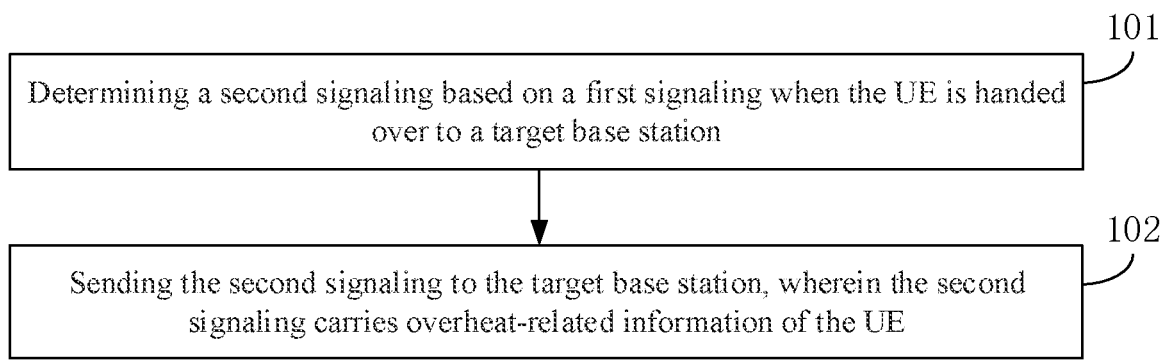
FIG. 1A is a flowchart illustrating a method for overheat protection of UE according to an exemplary embodiment.
Figure 1B:
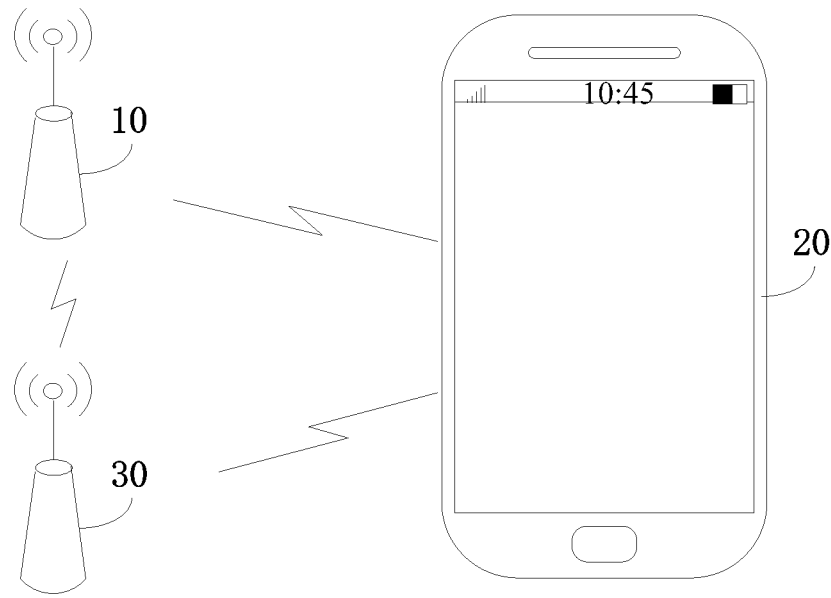
FIG. 1B is a scenario diagram illustrating a method for overheat protection of UE according to an exemplary embodiment.

FIG. 1A is a flowchart illustrating a method for overheat protection of UE according to an exemplary embodiment, and FIG. 1B is a scenario diagram illustrating a method for overheat protection of the UE according to an exemplary embodiment. The method for overheat protection of the UE may be applied to a source base station. As shown in FIG. 1A, the method for overheat protection of the UE includes the following steps 101-102.

In step 101, when the UE is handed over to a target base station, a second signaling is determined based on a first signaling.

In one embodiment, the first signaling is handover preparation signaling (HandoverPreparationInformation) in the related art, and the original handover preparation information is added with overheat-related information of the UE, which is, for example, overheat indication information indicating whether the UE is currently overheating, and/or a recommended configuration of the UE.

In one embodiment, the overheat-related information of the UE may further include whether the UE has an overheat resolution capability, that is, whether the UE has the capability of instructing the base station to reduce the wireless link configuration of the UE through the capacity of reporting the temporarily supported network when it is overheating.

In one embodiment, multiple manners are provided to determine the second signaling based on the first signaling. Please refer to description of embodiments shown in FIG. 2 to FIG. 5, which are not described in detail here.

In step 102, the second signaling is sent to the target base station, and the second signaling carries the overheat-related information of the UE.

In one embodiment, the second signaling may be sent on the time-frequency resource that the handover preparation signaling (HandoverPreparationInformation) is sent.

In an exemplary scenario, as shown in FIG. 1B, the scenario includes a source base station 10, UE (such as a smartphone and a tablet computer) 20, and a target base station 30, wherein when the user equipment 20 is handed over from the source base station 10 to the target base station 30, the source base station 10, based on the original handover preparation signaling, may generate a second signaling carrying overheat-related information of the UE and send it to the target base station 30. In this way, the source base station 10 transmits the overheat-related information of the UE 20 to the target base station 30, and the target base station 30 may configure an appropriate wireless link configuration for the UE based on the overheat-related information.

In the present embodiment, through the above steps 101 and 102, the source base station may transmit the overheat-related information of the UE to the target base station, so as to solve the problem in the related art that the target base station may provide an overheating UE with an excessively high wireless link configuration due to uncertain of the current states of the UE, thereby resulting in more serious overheating of the UE.

The details about how to protect the UE from overheating may refer to subsequent embodiments.

The following describes technical solutions according to the embodiment of the present disclosure with specific embodiments.

Figure 2:
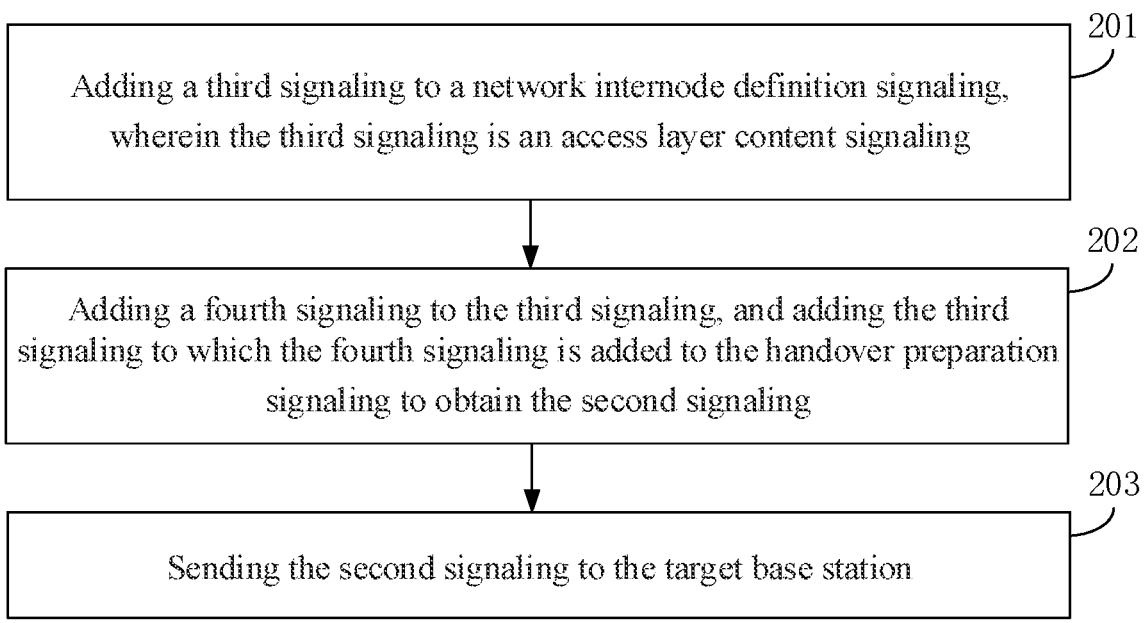
FIG. 2 is a flowchart illustrating another method for overheat protection of UE according to an exemplary embodiment.

FIG. 2 is a flowchart illustrating another method for overheat protection of the UE according to an exemplary embodiment. According to the above method provided by the embodiment of the present disclosure, this embodiment takes a method of how to determine the second signaling as an example for illustration. As shown in FIG. 2, the method includes the following steps.

In step 201, a third signaling is added to a network internode definition signaling, and the third signaling is an access stratum content signaling.

In step 202, a fourth signaling is added to the third signaling, and the third signaling to which the fourth signaling is added is added to the handover preparation signaling to obtain the second signaling.

In one embodiment, the fourth signaling is configured to indicate the overheat-related information of the UE.

In one embodiment, in the step 201 and step 202, one new third signaling, that is, the access stratum content (AS-Context-v14) signaling, may be designed in the network internode definition (EUTRA-InterNodeDefinitions) signaling, and one fourth signaling, that is, a UE assistance signaling (UEAssistanceInformation-r1430) is added to the access stratum content (AS-Context-v14) signaling, and then the access stratum content (AS-Context-v14) signaling is added to the handover preparation signaling (HandoverPreparationInformation) to obtain the second signaling. The second signaling may indicate overheat-related information of the UE by following codes:

```
AS-Context-v14 :: =    SEQUENCE {
Access stratum content signaling
overheatingAssistance-r14   OCTET STRING (CONTAINING
Overheating assistance information
    UEAssistanceInformation-r1430)   OPTIONAL,
User equipment assistance information
    --Cond HO2
}
```

In step 203, the second signaling is sent to the target base station.

In this embodiment, one manner of determining the second signaling is provided. The new access stratum content signaling is designed in the network internode definition signaling, the new UE assistance signaling is added to the new access stratum content signaling, and then the new access stratum content signaling is added to the handover preparation signaling, so that the transmission of the overheat-related information of the UE to the target base station is realized.

Figure 3:
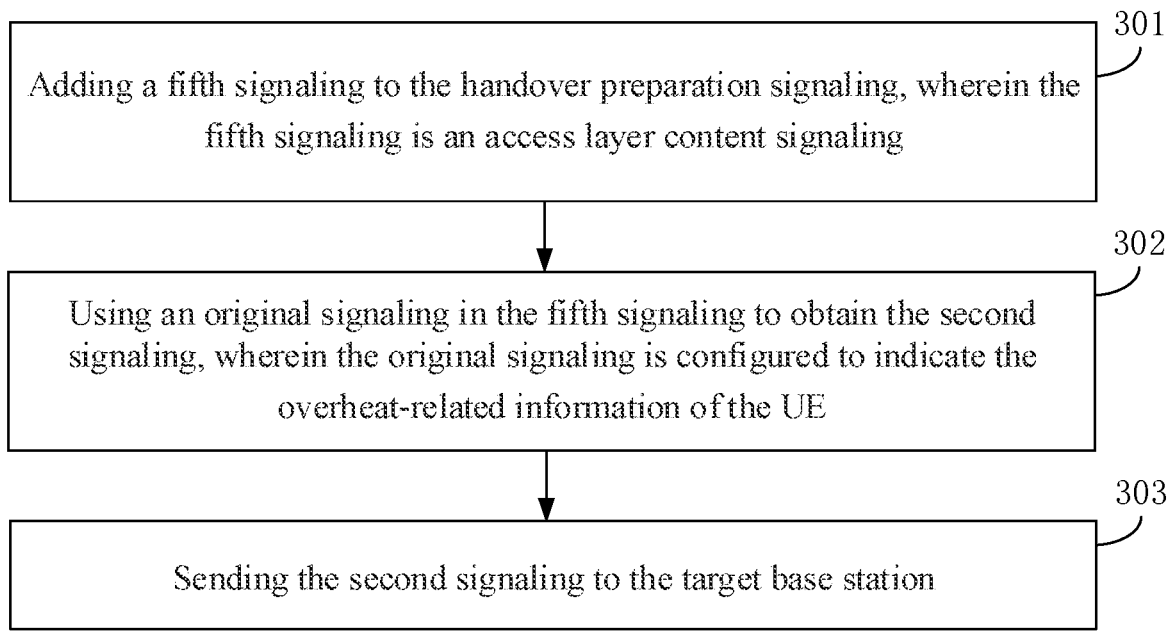
FIG. 3 is a flowchart illustrating a method for overheat protection of UE according to an exemplary embodiment.

FIG. 3 is a flowchart illustrating yet another method for overheat protection of the UE according to an exemplary embodiment. According to the above method provided by the embodiment of the present disclosure, this embodiment takes a method of how to determine the second signaling as an example for illustration description. As shown in FIG. 3, the method includes the following steps.

In step 301, a fifth signaling is added to the handover preparation signaling, and the fifth signaling is an access stratum content signaling.

In step 302, an original signaling is used in the fifth signaling to obtain the second signaling, and the original signaling is configured to indicate the overheat-related information of the UE.

In one embodiment, in the step 301 and step 302, one fifth signaling, that is, a new access stratum content (AS-Context-v14) signaling, may be added to the handover preparation signaling (HandoverPreparationInformation), and an original UE assistance signaling (UEAssistanceInformation-r11) is used in the layer content (AS-Context-v14) signaling, to indicate the overheat-related information of the UE to obtain the second signaling. The second signaling may indicate overheat-related information of the UE by following codes:

```
AS-Context-v14 ::=   SEQUENCE {
Access stratum content signaling
   overheatingAssistance-r14   OCTET STRING (CONTAINING
Overheating assistance information
      UEAssistanceInformation-r11) OPTIONAL,
User equipment assistance information
   --Cond HO2
}
```

In step 303, the second signaling is sent to the target base station.

In this embodiment, one manner of determining the second signaling is provided. The new access stratum content signaling is added to the handover preparation signaling, and in the new access stratum content signaling, the original UE assistance signaling is used to indicate the overheat-related information of the UE, thereby realizing the transmission of the overheat-related information of the UE to the target base station.

Figure 4:
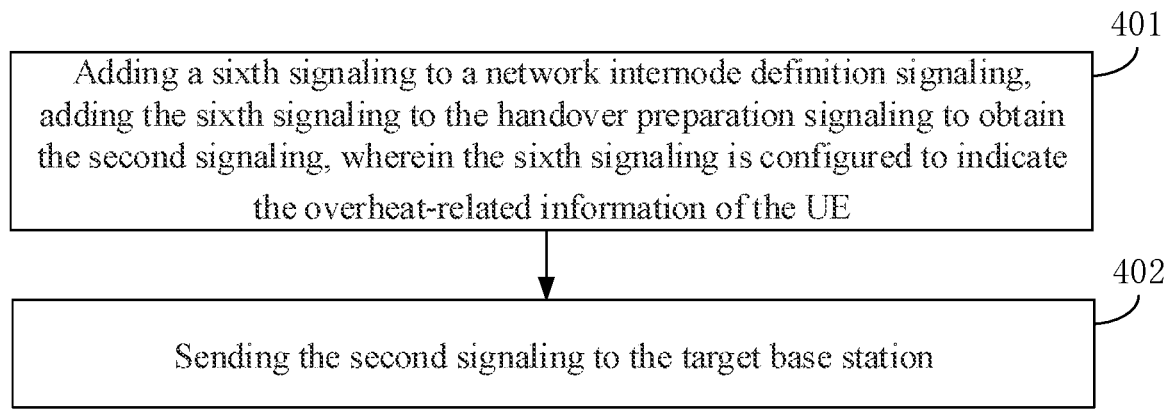
FIG. 4 is a flowchart illustrating yet another method for overheat protection of UE according to an exemplary embodiment.

FIG. 4 is a flowchart illustrating still a further method for overheat protection of the UE according to an exemplary embodiment. According to the above method provided by the embodiment of the present disclosure, this embodiment takes a method of how to determine the second signaling as an example for illustration. As shown in FIG. 4, the method includes the following steps.

In step 401, a sixth signaling is added to the network internode definition signaling, and the sixth signaling is added to the handover preparation signaling to obtain the second signaling. The sixth signaling is configured to indicate the overheat-related information of the UE.

In one embodiment, one new sixth signaling, that is, a UE assistance signaling (UEAssistanceInformation-r1430), may be added to the network internode definition (EUTRA-InterNodeDefinitions) signaling, and then the sixth signaling is added to the handover preparation signaling (HandoverPreparationInformation) to obtain the second signaling. The second signaling may indicate overheat-related information of the UE by following codes:

```
AS-Context-v1130 ::=   SEQUENCE {
Access stratum content signaling
   ...,
   overheatingAssistance-r14 OCTET STRING (CONTAINING
Overheat-related information
      UEAssistanceInformation-r1430) OPTIONAL,
      UE assistance information
--Cond HO2
```

In step 402, the second signaling is sent to the target base station.

In this embodiment, one manner of determining the second signaling is provided. By adding a new UE assistance signaling to the access stratum content signaling of the handover preparation signaling, the transmission of the overheat-related information of the UE to the target base station is realized.

Figure 5:
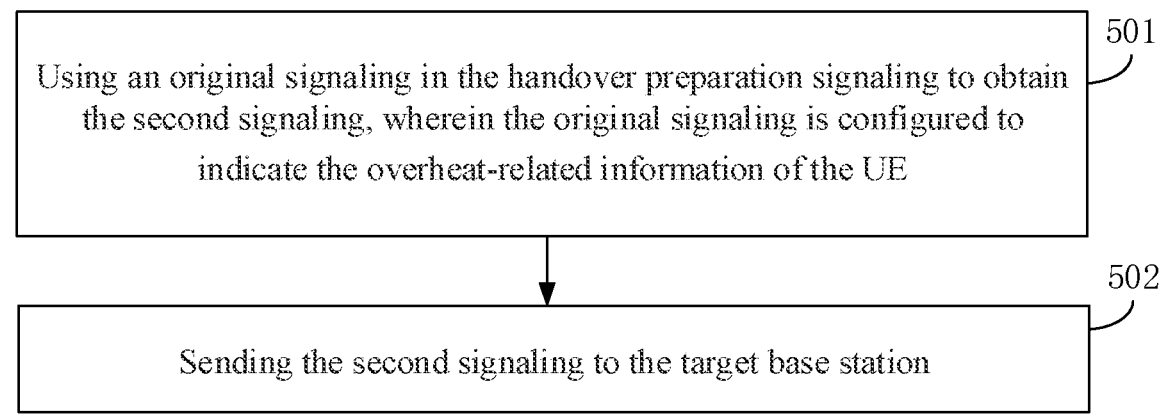
FIG. 5 is a flowchart of a method for overheat protection of UE implemented by interaction of a base station and the UE according to an exemplary embodiment.

FIG. 5 is a flowchart illustrating still another method for overheat protection of the UE according to an exemplary embodiment. According to the above method provided by the embodiment of the present disclosure, this embodiment takes a method of how to determine the second signaling as an example for illustration. As shown in FIG. 5, the method includes the following steps.

In step 501, an original signaling is used in the handover preparation signaling to obtain the second signaling, and the original signaling is configured to indicate the overheat-related information of the UE.

In one embodiment, the original UE assistance signaling (UEAssistanceInformation-r11) may be used in the handover preparation signaling (HandoverPreparationInformation) to obtain the second signaling. The second signaling may indicate overheat-related information of the UE by following codes:

```
AS-Context-v1130 ::=    SEQUENCE {
Access stratum content signaling
  ...
  overheatingAssistance-r14 OCTET STRING (CONTAINING
     Overheat indication information
        UEAssistanceInformation-r11) OPTIONAL,
        UE assistance information
     --Cond HO2
     }
```

In step 502, the second signaling is sent to the target base station.

In this embodiment, one manner of determining the second signaling is provided. By using the original UE assistance signaling in the access stratum content signaling of the handover preparation signaling to indicate the overheat-related information of the UE, the transmission of the overheat-related information of the UE to the target base station without wasting signaling resources is realized.

It may be understood by those skilled in the art that FIG. 2 to FIG. 5 disclose several manners of carrying the overheat-related information of the UE, which are not configured to limit the technical solutions of the present disclosure. The implementation manners of sending the overheat-related information of the UE to the target base station when the UE performs the base station handover, which are conceivable by those skilled in the art, are all within the protection scope of the technical solutions of the present disclosure.

Figure 6:
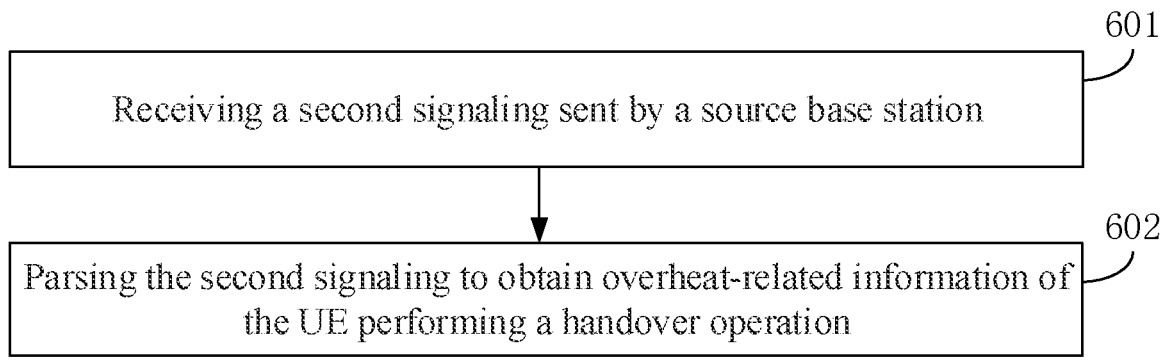
FIG. 6 is a flowchart illustrating a method for overheat protection of UE according to an exemplary embodiment.

FIG. 6 is a flowchart illustrating a method for overheat protection of the UE according to an exemplary embodiment. The method for overheat protection of the UE may be applied to a target base station. As shown in FIG. 6, the method for overheat protection of the UE includes the following steps 601-602:

In step 601, a second signaling sent by a source base station is received.

In one embodiment, the second signaling is obtained by designing new parameters or signaling based on the original handover preparation signaling, and includes overheat-related information of the UE performing the handover of the base station.

In one embodiment, the overheat-related information of the UE includes: overheat indication information indicating whether the UE is currently overheating, and/or a recommended configuration of the UE.

In one embodiment, manners of determining the second signaling based on the handover preparation signaling may refer to FIG. 2 to FIG. 5, and are not repeated in detail here.

In step 602, the overheat-related information of the UE performing the handover operation is parsed from the second signaling.

In an exemplary scenario, as shown in FIG. 1B, the scenario includes a source base station 10, a UE (such as a smartphone and a tablet computer) 20, and a target base station 30, wherein when the user equipment 20 is handed over from the source base station 10 to the target base station 30, the target base station 30 may receive the second signaling carrying the overheat-related information of the UE sent by the source base station 10, and the target base station 30 may configure the appropriate wireless link configuration for the UE based on the overheat-related information.

In the present embodiment, through the above step 601 and step 602, the target base station may determine the current state of the UE and configure the appropriate wireless link configuration for the overheating UE when the UE is handed over to the target base station.

Figure 7:
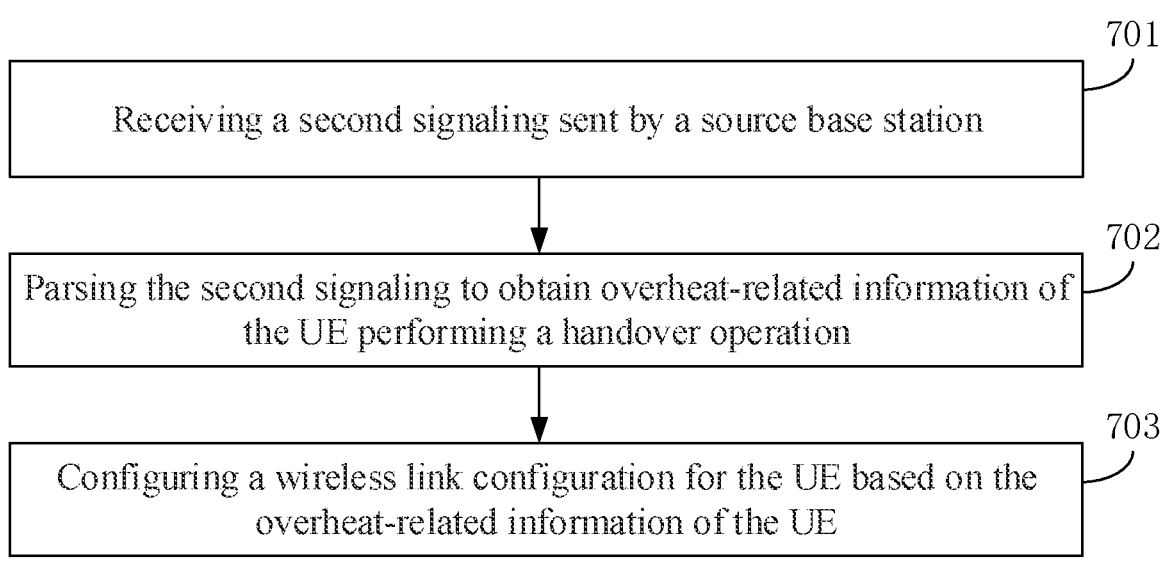
FIG. 7 is a flowchart illustrating a still further method for overheat protection of UE according to an exemplary embodiment.

FIG. 7 is a flowchart illustrating another method for overheat protection of the UE according to an exemplary embodiment. According to the above method provided by the embodiment of the present disclosure, this embodiment takes a method of how to configure a wireless link configuration for the UE by the target base station as an example for illustration. As shown in FIG. 4, the method includes the following steps.

In step 701, a second signaling sent by a source base station is received.

In step 702, the overheat-related information of the UE performing the handover operation is parsed from the second signaling.

In one embodiment, the overheat-related information of the UE includes overheat indication information indicating whether the UE is currently overheating, and/or a recommended configuration of the UE.

In step 703, the wireless link configuration is configured for the UE based on the overheat-related information of the UE.

In one embodiment, if the overheat-related information of the UE indicates that the UE is currently overheating and indicates the recommended configuration, the wireless link configuration may be configured for the UE according to the recommended configuration. In one embodiment, if the overheat-related information of the UE indicates that the UE is currently overheating, but does not indicate the recommended configuration, then a suitable wireless link configuration may be configured for the UE based on a network capability indicated by the UE. In one embodiment, if the overheat-related information of the UE indicates the recommended configuration, then the wireless link configuration may be configured for the UE directly according to the recommended configuration.

In one embodiment, the base station may determine wireless link configuration information of the UE to be adjusted based on the assistance information at first, and then adjust the wireless link configuration of the UE.

In this embodiment, through the above step 701 to step 703, the base station may configure the appropriate wireless link configuration for the UE based on the second signaling sent by the UE, thereby preventing the transmission of the service data from being interrupted due to overheating of the UE.

Figure 8:
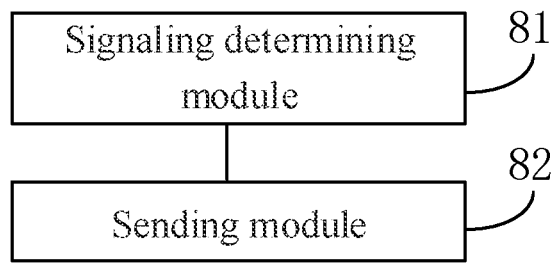
FIG. 8 is a block diagram of an apparatus for overheat protection of UE according to an exemplary embodiment.

FIG. 8 is a block diagram of an apparatus for overheat protection of the UE according to an exemplary embodiment. The apparatus is applied to a source base station. As shown in FIG. 8, the apparatus for overheat protection of the UE includes the following modules.

A signaling determining module 81 is configured to determine a second signaling based on a first signaling when the UE is handed over to a target base station, and the first signaling is an original handover preparation signaling.

A sending module 82 is configured to send the second signaling determined by the signaling determining module 81 to the target base station, wherein the second signaling carries overheat-related information of the UE.

Figure 9:
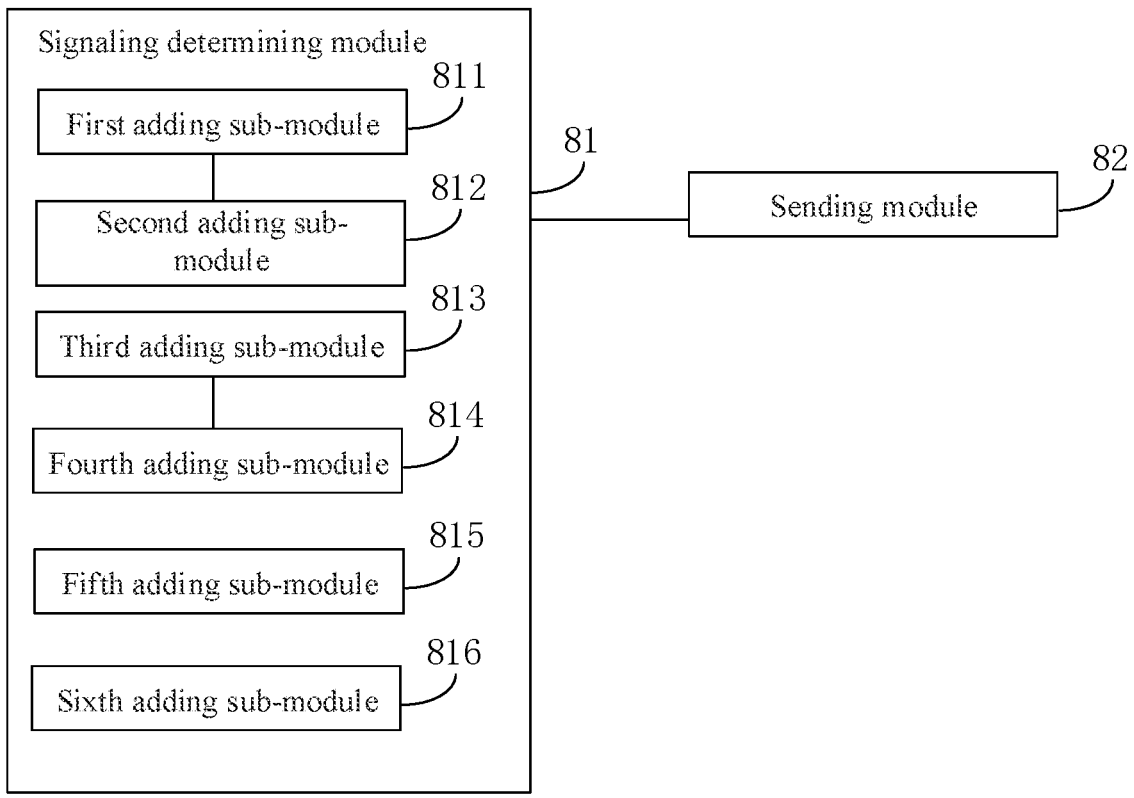
FIG. 9 is a block diagram of another apparatus for overheat protection of UE according to an exemplary embodiment.

FIG. 9 is a block diagram of another apparatus for overheat protection of the UE according to an exemplary embodiment. As shown in FIG. 9, based on the embodiment shown in FIG. 8 above, in one embodiment, the overheat-related information of the UE includes: overheat indication information indicating whether the UE is currently overheating, and/or a recommended configuration of the UE.

In one embodiment, the signaling determining module 81 includes the following modules.

A first adding sub-module 811 is configured to add a third signaling to a network internode definition signaling, and the third signaling is an access stratum content signaling.

A second adding sub-module 812 is configured to add a fourth signaling to the third signaling, and add the third signaling to which the fourth signaling is added to the handover preparation signaling to obtain a second signaling, and the fourth signaling is configured to indicate the overheat-related information of the UE.

In one embodiment, the signaling determining module 81 includes the following modules.

A third adding sub-module 813 is configured to add a fifth signaling to the handover preparation signaling, and the fifth signaling is an access stratum content signaling.

A fourth adding sub-module 814 is configured to use an original signaling in the fifth signaling to obtain the second signaling, and the original signaling is configured to indicate the overheat-related information of the UE.

In one embodiment, the signaling determining module 81 includes the following module.

A fifth adding sub-module 815 is configured to add a sixth signaling to the network internode definition signaling, and the sixth signaling is configured to indicate the overheat-related information of the UE; and the sixth signaling is added to the handover preparation signaling to obtain the second signaling.

In one embodiment, the signaling determining module 81 includes the following module.

A sixth adding sub-module 816 is configured to use an original signaling in the handover preparation signaling to obtain the second signaling, and the original signaling is configured to indicate the overheat-related information of the UE.

Figure 10:
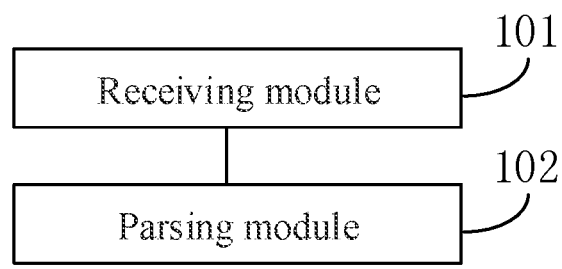
FIG. 10 is a block diagram of an apparatus for overheat protection of UE according to an exemplary embodiment.

FIG. 10 is a block diagram of an apparatus for overheat protection of the UE according to an exemplary embodiment. The apparatus is applied to a target base station. As shown in FIG. 10, the apparatus for overheat protection of the UE includes the following modules.

A receiving module 101 is configured to receive a second signaling sent by a source base station.

An parsing module 102 is configured to parse the second signaling received by the receiving module to obtain the overheat-related information of the UE performing the handover operation.

Figure 11:
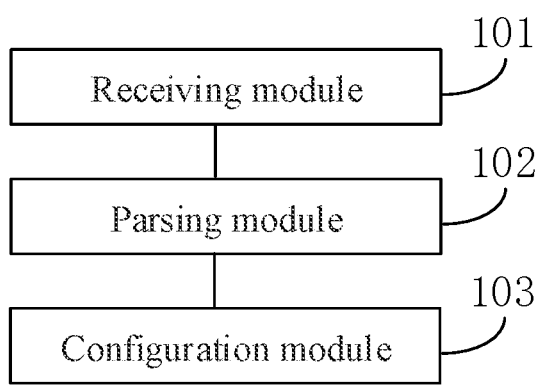
FIG. 11 is a block diagram of another apparatus for overheat protection of UE according to an exemplary embodiment.

FIG. 11 is a block diagram of another apparatus for overheat protection of the UE according to an exemplary embodiment. As shown in FIG. 11, based on the embodiment shown in FIG. 10 above, in one embodiment, the overheat-related information of the UE includes: overheat indication information indicating whether the UE is currently overheating, and/or a recommended configuration of the UE.

In one embodiment, the apparatus further includes the following module.

A configuration module 103 is configured to configure a wireless link configuration for the UE based on the overheat-related information of the UE.

Regarding the apparatus in the above embodiment, the specific manner in which each module performs the operation has been described in detail in the embodiment of the method, and not be repeated in detail here.

Figure 12:
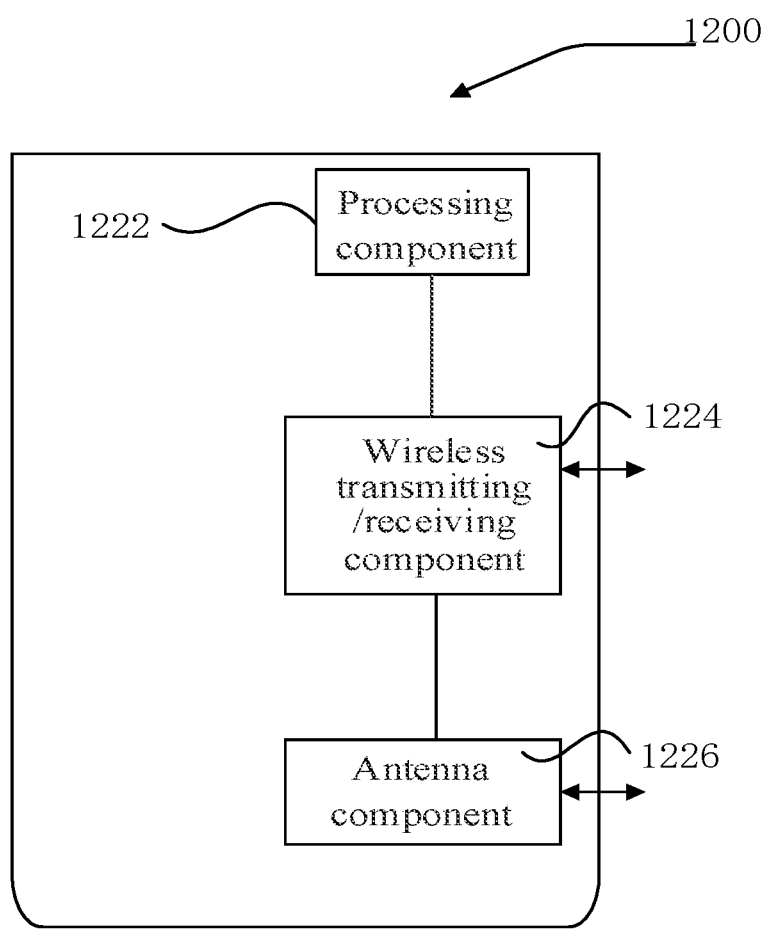
FIG. 12 is a block diagram of an apparatus suitable for overheat protection of UE according to an exemplary embodiment.

FIG. 12 is a block diagram of an apparatus suitable for overheat protection of the UE according to an exemplary embodiment. The apparatus 1200 may be provided as a base station. Referring to FIG. 12, the apparatus 1200 includes a processing component 1222, a wireless transmitting/receiving component 1224, an antenna component 1226, and a signal processing portion unique to a wireless interface. The processing component 1222 may further include one or more processors.

When the apparatus 1200 is a source base station, one of the processors in the processing component 1222 may be configured to execute the method for overheat protection of the UE described in the above first aspect.

When the apparatus 1200 is a target base station, one of the processors in the processing component 1222 may be configured to execute the method for overheat protection of the UE described in the above second aspect.

In exemplary embodiments, a non-transitory computer readable storage medium including instructions is also provided, executable by the processor 1200 in the apparatus 1222, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for overheat protection of user equipment (UE), the method comprising:
   determining, by a source base station, a second signaling based on a first signaling when the UE is handed over to a target base station, wherein the first signaling is a HandoverPreparationInformation signaling; and
   sending, by the source base station, the second signaling to the target base station on a time-frequency resource that the first signaling is sent, wherein the second signaling carries overheat-related information of the UE,
   wherein determining the second signaling based on the first signaling comprises one of:
   adding a AS-Context-v14 signaling to a EUTRA-InterNodeDefinitions signaling, adding a UEAssistanceInformation-r1430 signaling to the AS-Context-v14 signaling, and adding the AS-Context-v14 signaling to which the UEAssistanceInformation-r1430 signaling is added to the HandoverPreparationInformation signaling to obtain the second signaling, wherein the UEAssistanceInformation-r1430 is configured to indicate the overheat-related information of the UE; or
   adding a UEAssistanceInformation-r1430 signaling to a EUTRA-InterNodeDefinitions signaling, wherein the UEAssistanceInformation-r1430 signaling is configured to indicate the overheat-related information of the UE, and adding the UEAssistanceInformation-r1430 signaling to the HandoverPreparationInformation signaling to obtain the second signaling.

2. The method according to claim 1, wherein the overheat-related information of the UE comprises at least one of: overheat indication information indicating whether the UE is currently overheating, or a recommended configuration of the UE.

3. A method for overheat protection of UE, wherein the method is applied to a target base station, and the method comprises:
   receiving a second signaling sent by a source base station, wherein the second signaling is determined by the source base station based on a first signaling when the UE is handed over to the target base station, the second signaling is sent by the source base station on a time-frequency resource that the first signaling is sent, the first signaling is a HandoverPreparationInformation signaling; and
   parsing the second signaling to obtain the overheat-related information of the UE performing a handover operation,
   wherein the source base station determines the second signaling based on the first signaling by one of:
   adding a AS-Context-v14 signaling to a EUTRA-InterNodeDefinitions signaling, adding a UEAssistanceInformation-r1430 signaling to the AS-Context-v14 signaling, and adding the AS-Context-v14 signaling to which the UEAssistanceInformation-r1430 signaling is added to the HandoverPreparationInformation signaling to obtain the second signaling, wherein the UEAssistanceInformation-r1430 is configured to indicate the overheat-related information of the UE; or
   adding a UEAssistanceInformation-r1430 signaling to a EUTRA-InterNodeDefinitions signaling, wherein the UEAssistanceInformation-r1430 signaling is configured to indicate the overheat-related information of the UE, and adding the UEAssistanceInformation-r1430 signaling to the HandoverPreparationInformation signaling to obtain the second signaling.

4. The method according to claim 3, wherein the overheat-related information of the UE comprises at least one of: overheat indication information indicating whether the UE is currently overheating, or a recommended configuration of the UE.

5. The method according to claim 3, further comprising:
configuring a wireless link configuration for the UE based on the overheat-related information of the UE.

6. An apparatus for overheat protection of UE, wherein the apparatus is applied to a source base station, and the apparatus comprises:
one or more processors; and
a memory configured to store processor-executable instructions; wherein
the one or more processors are configured to:
determine a second signaling based on a first signaling when the UE is handed over to a target base station on a time-frequency resource that the first signaling is sent, wherein the first signaling is a HandoverPreparationInformation signaling; and
send the second signaling to the target base station, wherein the second signaling carries overheat-related information of the UE,
wherein the one or more processors are configured to determine the second signaling based on the first signaling comprises that the one or more processors are configured to perform one of:
adding a AS-Context-v14 signaling to a EUTRA-InterNodeDefinitions signaling, adding a UEAssistanceInformation-r1430 signaling to the AS-Context-v14 signaling, and adding the AS-Context-v14 signaling to which the UEAssistanceInformation-r1430 signaling is added to the HandoverPreparationInformation signaling to obtain the second signaling, wherein the UEAssistanceInformation-r1430 is configured to indicate the overheat-related information of the UE; or
adding a UEAssistanceInformation-r1430 signaling to a EUTRA-InterNodeDefinitions signaling, wherein the UEAssistanceInformation-r1430 signaling is configured to indicate the overheat-related information of the UE, and adding the UEAssistanceInformation-r1430 signaling to the HandoverPreparationInformation signaling to obtain the second signaling.

7. The apparatus according to claim 6, wherein the overheat-related information of the UE comprises at least one of: overheat indication information indicating whether the LIE is currently overheating, or a recommended configuration of the UE.

8. An apparatus for overheat protection of UE, wherein the apparatus is applied to a target base station, and the apparatus comprises:
one or more processors; and
a memory configured to store processor-executable instructions; wherein
the one or more processors are configured to:
receive a second signaling sent by a source base station, wherein the second signaling is determined by the source base station based on a first signaling when the UE is handed over to the target base station, the second signaling is sent by the source base station on a time-frequency resource that the first signaling is sent, the first signaling is a HandoverPreparationInformation signaling; and
parse the second signaling to obtain the overheat-related information of the UE performing a handover operation,
wherein the source base station determines the second signaling based on the first signaling by one of:
adding a AS-Context-v14 signaling to a EUTRA-InterNodeDefinitions signaling, adding a UEAssistanceInformation-r1430 signaling to the AS-Context-v14 signaling, and adding the AS-Context-v14 signaling to which the UEAssistanceInformation-r1430 signaling is added to the HandoverPreparationInformation signaling; to obtain the second signaling, wherein the UEAssistanceInformation-r1430 is configured to indicate the overheat-related information of the UE; or
adding a UEAssistanceInformation-r1430 signaling to a EUTRA-InterNodeDefinitions signaling, wherein the UEAssistanceInformation-r1430 signaling is configured to indicate the overheat-related information of the UE, and adding the UEAssistanceInformation-r1430 signaling to the HandoverPreparationInformation signaling to obtain the second signaling.

9. The apparatus according to claim 8, wherein the overheat-related information of the UE comprises at least one of: overheat indication information indicating whether the UE is currently overheating, or a recommended configuration of the UE.

10. The apparatus according to claim 8, wherein the one or more processor are further configured to:
configure a wireless link configuration for the UE based on the overheat-related information of the UE.

* * * * *